INVENTORS
JULIUS ROCKWELL, JR.
GEORGE M. LUCICH

United States Patent Office 3,509,325
Patented Apr. 28, 1970

3,509,325
BIDIRECTIONAL COUNTER APPARATUS WITH SEPARATE DETECTORS
Julius Rockwell, Jr., Washington, D.C., and George M. Lucich, Seattle, Wash., assignors to the United States of America as represented by the Secretary of the Interior
Filed Nov. 15, 1966, Ser. No. 594,586
Int. Cl. G06m 11/04
U.S. Cl. 235—92
8 Claims

ABSTRACT OF THE DISCLOSURE

A bidirectional fish counting apparatus in which electrodes of bridge detector circuitry are paired for affixture at each of the respective opposite end openings of underwater passageways wherefore the electrodes are enabled when operable to set up separate electric fields across the respective openings. Resistive variances in arms of the bridge circuitry due to the presence of fish in the electric fields when fish pass through the openings selectively determine inputs to a logic circuit control of directional counters. The electrodes at the openings on the respective sides of the passageways are operationally associated to the bridge and logic control through distinct circuits which are electrically isolated from each other. Made possible thereby is the use of relatively short passageways for reducing the likelihood of the simultaneous presence of fish in any opening to promote counting accuracy.

---

This invention relates to an electrical apparatus for counting objects having mobility in a fluid and having a conductivity different from that of the fluid, such as fish or fish eggs moving in water that is not otherwise brackish. The apparatus comprises in a water restraining wall or in a weir, a conduit structure, which may be a restrictive passageway or a relatively short length of pipe or tubing, disposed with its open ends in position to provide a clear passage through which objects to be counted may pass. Sensing elements are maintained located within the conduit structure so as to respond to the presence of the traversing objects wherefore they determine the operation of an electrical system controlling the indicating function of registering devices and recording devices that can be operatively associated in the apparatus. The registering devices are selectively controlled to give as separate counts in accordance with direction the number of objects which pass completely through the conduit structure in opposite directions.

The usefulness of the instant apparatus becomes apparent when the needs and problems of counting anadromous fish is considered. In fresh water streams, up which the fish migrate from a sea or lake, the conductivity of the water is considerably less than that of the fish so that their presence is readily detectable by the sensing elements. Muddy water, leaves, sticks, grass, waterlogged sticks, bottles, most metal cans, and occasional small air bubbles, etc., do not register, hence the substances counted through submerged openings are almost invariably limited to fish. It is also possible with this apparatus to determine the minimum size of fish to be counted and count fish only above this size. Thus, when counting salmon, resident trout may be neglected by the counter. Also, experience has demonstrated that the movement of fish is generally not continuous. Rather a forward and back motion is typical and generally before completing a passage through an opening several exploratory advances are made. Artificial restraints such as weirs, leads, and traps can be used to insure a one way passage and count but these devices are cumbersome to maintain and many feel that their presence inhibits the progress of the fish upstream to their spawning grounds, or, in the case of the young fish on their way to sea, concentrates them, increasing their vulnearibility to predation, or otherwise endangering them. Therefore, the counting of fish by an automatic apparatus such as the present invention will be more economical, more accurate, and result in less influence on the fish themselves than by most other arrangements. In the cases of fish moving in darkness, in muddy waters, or through deep openings the invention provides a means of counting fish without delaying them.

Particular advantages of the apparatus in the system disclosed herein are its ability to provide directional count of only fish above the size desired, and the short length of the sensitive passage. This latter advantage is considerable because in longer passages two fish following in close succession are usually counted as one unless the first leaves the counting volume before the second arrives in it. Moreover, shorter tubes are more economical if prefabricated tubes are used, or, if the conduit structure is built into a wall as described below, counting the fish through the submerged orifice in the wall can be accomplished without altering the carefully designed hydraulic structure of the fish passage system. Fish counters of the type hereinafter described have special utility for counting adult salmon in small fishways as well as young salmon moving through weirs, out of fyke nets, or in hatcheries. Multicounter arrays can be employed to count adult fish moving through weirs or in large fishways as well as into hatchery ponds.

According to the present invention the detecting devices comprise only two separate pairs of electrodes which are spatially arranged in the conduit structure to accomplish the aforesaid bidirectional count in an accurate and dependable manner. In the unique arrangement of electrodes employed by the invention electrical phenomenon in either of the conductive paths between the electrodes constituting the respective pairs does not influence that occurring in the conductive path between the other electrode pair. Relatively close spacing of the electrode pairs is also achieved such that the use of shorter conduit structures becomes practicable. As a result, increased counting accuracy and reliability is obtained since, as hereinbefore indicated, the shorter the passage the objects are required to traverse for a proper count the less the incidence of more than one object occupying the conduit structure at any one time, wherefore undercounts are minimized.

The conduit structure of the present invention is essentially a restricted orifice defined by an enclosure in which the aforesaid electrode pairs are fixed to opposing surfaces. Structure of this sort, found disclosed in Patent No. 2,893,633, issued on July 7, 1959, to R. H. Van Haagen, utilizes three hoop-like electrodes which differs widely from the present invention wherein spaced-apart electrodes are arranged in separately distinct pairs. When the orifice tube of the present invention is in an operating condition located under water to count fish, a conductive path linking the energized electrodes of each pair is completed through the water constituting a conductive medium between these electrodes. Whereas Van Haagen's hoops must be spaced along a longitudinal axial path through a fish passage tube structure to facilitate current flow through conductive paths defined between the hoops, the arrangement of the present invention confines between the electrodes of each of its effectively electrically isolated pairs of electrodes a conductive path directed at approximately right angles to the longitudinal axial path through the tube structure.

It is therefore an aim of the present invention to provide a compact and efficiently responsive structure for detecting moving substances, and having particular utility in an underwater object counting apparatus.

A further aim of the present invention is to provide for cooperation with bidirectional electrical registering devices an electrical system having object detecting circuits which are completed through electrodes arranged in pairs defining electrically isolated conductive paths across a conduit through which the objects pass to be counted.

These and other objects and advantages of the invention will be more clearly understood from the following description of a preferred embodiment of the invention considered together with the accompanying drawing wherein.

Figure 1:
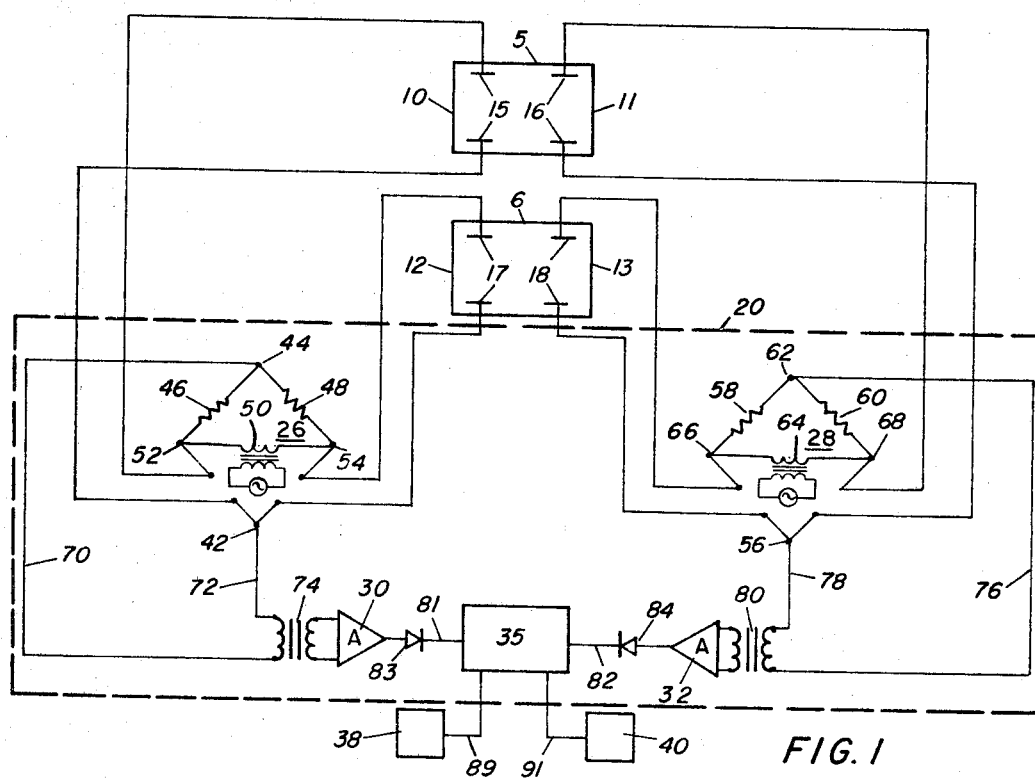
FIG. 1 is a diagrammatic circuit and block representation of the apparatus according to the present invention.

Represented by the showing in FIG. 1 is an apparatus according to the present invention particularly useful for counting fish passing into and out of restricted orifices located under water in the wall of a fishway step, or a similar water flow regulating structure or in a counting fence or weir. Each of two substantially identical conduit structures 5 and 6 are seen presenting at opposite ends thereof, orifices 10 and 11, and 12 and 13, respectively, for traverse by fish moving in either direction. Fixed to the inner walls of conduit structures 5 and 6 are electrode pairs 15 and 16, and 17 and 18, respectively. Operatively associated with conduit structures 5 and 6 is a registering control system 20 comprising a pair of bridge circuits 26 and 28, having coupled thereto A.C. amplifiers 30 and 32 and a logic circuit 35 connected in the system to receive from the amplifiers the operate signals which are derived in the bridge circuit. Signals produced as an output from control system 20 are transmitted from its logic circuit 35 to electrical devices for actuating registering counters 38 and 40.

More particularly, bridge circuit 26 is constituted by two arms, conducting through a terminal 42, which contain resistance components at conduit structures 5 and 6 comprising electrode pairs 15 and 17, and two further arms, conducting through a terminal 44, which contain reactances, such as resistances 46 and 48, suited to enable a balance of bridge circuit 26 in the absence of detectable objects in the passages between electrodes 15 and 17, as will be hereinafter more fully explained. Each of the resistances comprising an electrode pair is formed by the high resistance conductive path through the water between the electrode elements of the pair. This high resistance is significantly affected by any material change in the conductivity of the contents in the passage defined by the electrodes such that it would be detectably modified in response to the introduction of the substance of a fish within the passage. Energizing power for bridge circuit 26 is furnished by a sinusoidal oscillator 50, connected across further conductive terminals 52 and 54 which complete the connections between the bridge arms in a conventional manner. A corresponding arrangement of parts which constitutes bridge circuit 28, includes in its two bridge arms conducting through a terminal 56, resistance components defined by electrode pairs 16 and 18 at the conduit structure 5 and 6, a pair of balancing resistances 58 and 60 in bridge arms conducting through a terminal 62, and an energizing sinusoidal oscillator 64 connected across further conductive terminals 66 and 68 of the bridge. Each of the two sinusoidal oscillators operate at different frequencies which are not harmonics of each other, and are inductively coupled in their respective bridge circuits to avoid any possible interaction between these circuits due to currents induced, or leaked through grounded connections. Current made available between terminals 42 and 44 consonant with an unbalance in bridge circuit 26, is carried by leads 70 and 72 to amplifier 30 by way of a coupling transformer 74, and unbalance current present between terminals 56 and 62 of bridge circuit 28 is carried by leads 76 and 78 to amplifier 32 by way of a coupling transformer 80. These coupling transformers also act to isolate the bridge circuits from grounded connections. The respective outputs from the amplifiers are received in logic circuit 35 on leads 81 or 82 wherein diodes 83 and 84 are arranged to secure unidirectional inputs to the logic circuit.

In adapting the apparatus disclosed herein to operate under water at a selected location, it is sometimes desirable to use only one of the conduit structures for a fish passage. In such instances, the other conduit structure is placed in the water where it may be grilled closed to fish or placed where fish passage is unlikely since it thus remains effective to maintain the initially set balanced conditions in the bridge circuits when the conductivity of the water varies with environmental changes. In most locations the likelihood of simultaneous occupancy of both said conduit structures is so remote that both can generally be left open to fish passage. When employing conduit structure 5 as a null control for the bridge circuits, and conduit structure 6 as a fish detector, it will be found that any fish passing through orifice 12, first enters between the elements of electrode pair 17, and modifies the resistance of the conductive path through the water at orifice 12. Continued movement of this fish in the same direction through conduit structure 6 will thereafter affect, in sequence, the resistance of the conductive paths between both electrode pairs 17 and 18, the conductive path between electrodes pair 18 alone, and finally neither conductive path as the fish leaves the conduit structure through orifice 13. Any fish entering orifice 13, and passing through the conduit structure to exit at orifice 12, modifies the resistances of the conductive paths in a reverse sequence whereby electrode pair 18, electrode pairs 18 and 17, electrode pair 17 and then neither electrode pair are affected. To obtain the responses heretofore described manifestly requires a conduit structure in which the spacing between the pairs of electrodes is commensurate with the characteristic length of the particular fish to be counted so that both electrode pairs can be concurrently affected at some instance during the traverse of the fish.

The forward and reverse sequences of signal responses produced at the output terminals of the bridge circuits in accordance with the direction of fish traversing conduit structure 6 by way of orifice 12 to orifice 13, and orifice 13 to orifice 12, respectively, are received in logic circuit 35 and determine its output on a pair of leads 89 and 91, supplying operate pulses to registering counters 38 and 40, respectively, and/or signal outputs to other remote or adjacent control devices, indicators or recorders. The respective registering counters can be termed upstream and downstream counters whereon are separately indicated the numbers of fish moving in each of the aforesaid directions through conduit structure 6. The other adjacent or remote devices include but are not limited to cameras to photograph fish leaving the orifice, remote count registers, alarm systems set to warn hatchery personnel when the desired number of fish have entered a pond, and control systems to prevent more than the desired number of fish from entering. Logic circuit 35 may be of conventional design employing relays or other electrically controlled switching units including solid state devices. An appropriate arrangement of gating circuits for these switching units to selectively provide such outputs on separate lines is that which effects completely the switch function sequence $\overline{AB}$, $A\overline{B}$, $AB$, $\overline{A}B$, $\overline{AB}$, and $\overline{AB}$, $\overline{A}B$, $AB$, $A\overline{B}$, $\overline{AB}$, respectively, where A and $\overline{A}$ indicate the modified and normal states, respectively, of the conductive path between the elements of electrode pair 17, and B and B indicate the modified and normal states, respectively, of the conductive path between the elements of electrode pair 18. A circuit meeting all the requirements of the aforesaid logic is fully described in Patent No. 2,603,419, granted on July 15, 1952, to Barker et al. In adapting the patented circuit to function as logic circuit 35 of the present invention the two leads providing the respective inputs to the patent's primary or initial directional control relays are made to correspond to the input leads 81 and 82 shown in FIG. 1, in a manner well within the ordinary skill of the art.

Figure 3:
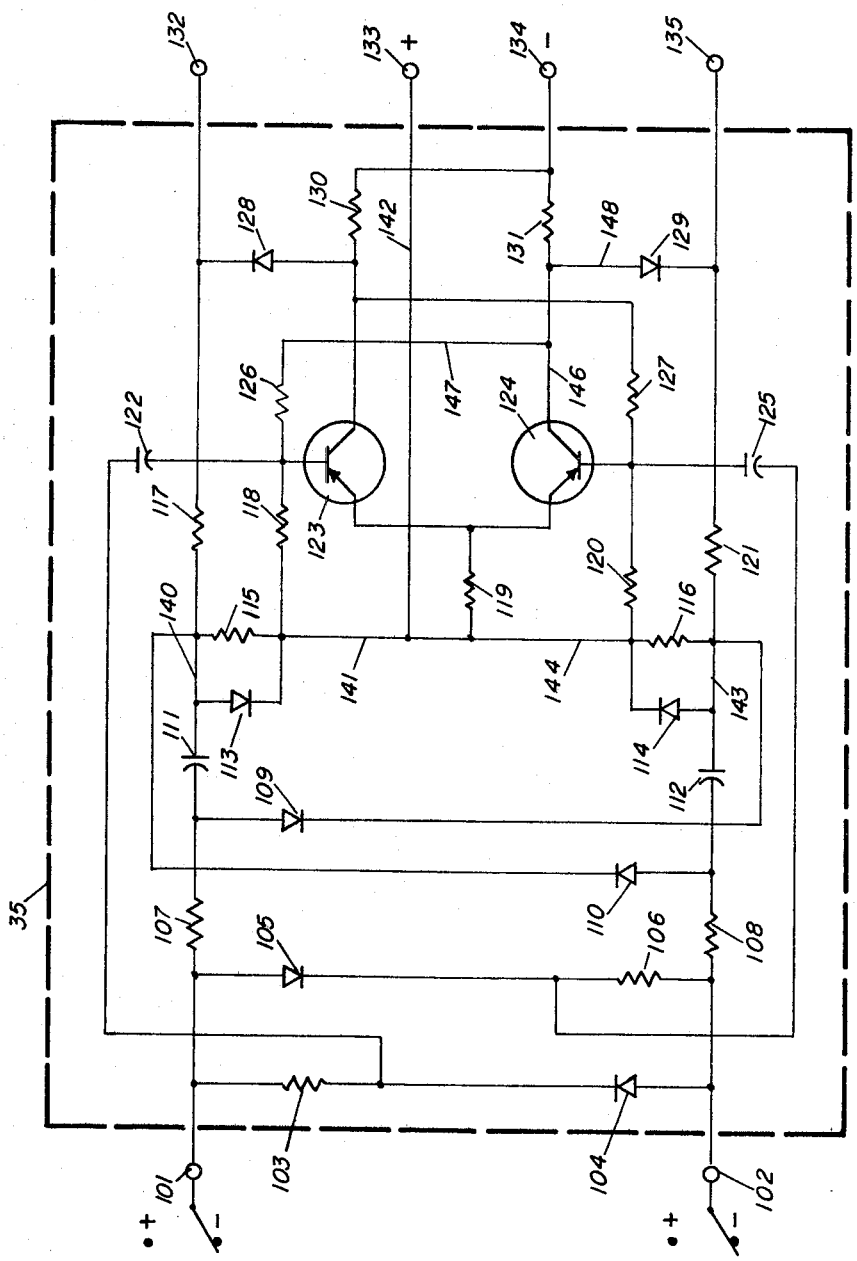
FIG. 3 is an electrical schematic showing of one form of a logic circuit having utility in the present invention.

Exemplary of a solid state configuration for a suitable, faster operating logic circuit 35, is the arrangement shown in FIG. 3. Terminals 101 and 102 receive signals provided on leads 81 and 82, respectively, shown in FIG. 1. In a steady state condition of the energized circuit, when neither of two electrode pairs in a conduit sense a fish, both input terminals are at a negative potential. Sensing a fish at an electrode pair changes the state of the corresponding terminal to positive. Register actuating outputs are produced as negative pulses at the terminals 132 or 135, in accordance with the direction of the fish's net movement wherein it traverses the conduit. Such negative pulses are applicable to operatively condition one or the other of two PNP type transistors whose bases are separately connected to the respective output terminals. These transistors, which have their emitters connected together at an intermediate point of a voltage divider arranged across the positive and negative terminals of a power source, are in essence a stage of an amplifying circuit supplying outputs to selectively effect the actuation of two directional counters. This voltage divider functions in the circuit to hold the emitters biased negative with respect to the common positive connection by a predetermined voltage valve. Thus a requisite threshold voltage of the predetermined value or greater must be reached at terminals 132 or 135 in order to produce an amplifier output which effectuates a directional counting operation. Terminals 133 and 134 are connected to the positive and negative sides, respectively, of the D.C. power source. A pair of PNP transistors 123 and 124 are provided to operate in a flip-flop circuit including resistors 118, 119, 120, 126, 127, 130 and 131. Transistors 123 and 124 function in the bistable flip-flop in a conventional manner so as to conduct one at a time in response to on and off switching by application of a negative pulse to the base of an off transistor, and a positive pulse to the base of an on transistor, respectively. Operating with a steady state negative potential at terminals 101 and 102, with transistor 124 on and transistor 123 off, the circuit supplies voltage between terminals 101 and 133, through resistance 115, and leads 140, 141, and 142, to charge a condenser 111 to the supply potential. A condenser 112 is similarly charged through a resistance 116 by way of terminal 102, leads 143, 144, 142 and terminal 133. A group of current flow control devices in the logic circuit, including diodes 104, 105, 109, 110, 113, and 114, are reversed biased and non-conducting.

Sensing of a fish by an electrode pair corresponding to terminal 101, changes the terminal potential to positive. As a result, a positive potential is applied to the base of transistor 124 in a circuit traceable from terminal 101 through the low impedance of diode 105 and a condenser 125, whereby the transistor is switched to off. A negative pulse appearing at the collector of transistor 124 is conducted by leads 146 and 147 to resistances 126 and 131 and by lead 148 to the anode of diode 129. The negative pulse is thus applied through resistance 126 to the base of transistor 123 which is also connected to resistance 118, and a condenser 122. Transistor 123 is switched on and its collector applies positive potential at the junction of a diode 128 and resistances 130 and 127. Concurrently therewith condenser 122 is charged through high impedance 103 and condenser 125 is charged through diode 105.

Continued movement of the fish affecting two electrode pairs applies positive potential at both input terminals 101 and 102. However, since the immediately previous circuit condition, which had positive potential at only terminal 101, maintained condensers 122 and 125 positive with respect to the transistors, the instant operational state of the circuit is not changed. Further movement of the fish out from between the initial electrode pair permits terminal 101 to revert to negative. Condenser 111 further charges through parallel combination of resistances 108 and 115 but the negative pulse at terminal 101 is not seen at output terminal 132 since that point is held positive through a circuit including resistance 119, transistor 123 and diode 128. When the same directional movement of the fish clears the conduit, terminal 102 becomes negative whereby a negative pulse passes through resistance 108, discharging condenser 112, and passes through resistance 121 to provide a negative output at terminal 135. Even though input terminal 101 is also negative when the fish finally clears the conduit, any resulting negative potential appearing as output on terminal 132 is relatively small and below the threshold value previously defined as that required to trigger the amplifier stage initiating counter actuation. This negative potential at terminal 132 is rendered ineffective by the opposing positive potential supplied at the output terminal through diode 128 and resistor 119 as a result of the operational or on condition of transistor 123 in circuit therewith, due to the switching of this transistor previously effected by a positive pulse at input terminal 101. Because the transistors of the bistable network are appropriately conditioned by the first event in the sequence of fish travel through the conduit, any later event in the sequence which provides a positive pulse at terminal 101 would obviously not change such condition whereby the circuit remains effective to give a proper operation. Moreover, for the possible sequence of $\overline{AB}$, $A\overline{B}$, AB, $A\overline{B}$, AB, $A\overline{B}$, $\overline{AB}$, wherein a fish turns about in the conduit and moves back toward the orifice it entered before completing its passage, during which time the flip-flop is not interfering or blocking a negative output at terminal 135, the positive input maintained at terminal 101 holds the output at this terminal positive through resistor 107 and diode 109. Since the two halves of the circuit are symmetrical a reverse passage of the fish through the conduit would cause the negative pulse to appear at output terminal 132.

Figure 2:
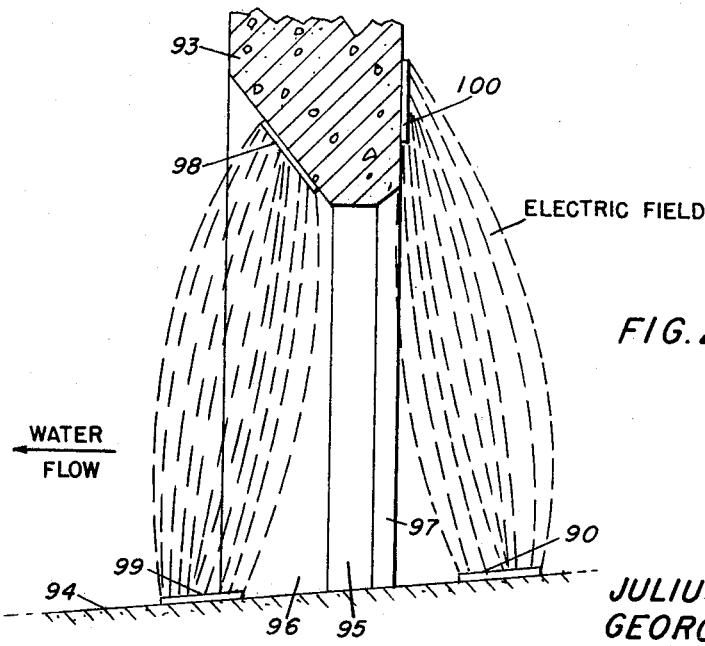
FIG. 2 is a fragmentary vertical sectional view illustrating one form of the conduit structure of the apparatus represented in FIG. 1.

The paired electrodes can consist of strips of conductive material attached to opposing surfaces of fish passages through water restraining structures in a heretofore explained manner. As illustrated in FIG. 2, such a passage is seen in a wall structure 93 supported on a bottom 94 of a weir or step in a fishway. The passage is a rectangular opening 95 whose downstream side merges with a relatively wide flared orifice 96, and upstream side merges with a narrower flared orifice 97. A pair of rectangular electrode strips 98 and 99 are shown on the downstream side as fixed, respectively, on the upper flaring surface of orifice 96, and on bottom surface 94 so as to extend partially outside the passage. An upstream pair of rectangular strips 100 and 90 are shown as fixed respectively on the vertical surface of wall 93 adjacent to the upper flaring surface of orifice 97, and on bottom surface 94, a short distance in front of the passage.

As was hereinbefore noted, the instant electrode pairs must be so formed and arranged as to define electric fields directed approximately at right angles to a plane parallel to bottom 94 and located along a longitudinal axis of the passage. These electric fields, as indicated by the broken lines in FIG. 2, are characterized by a greater concentration along lines directly between the opposite electrode elements of each pair, and becomes very greatly reduced beyond the edges of the electrodes. As was also previously explained, each electrode pair is made part of a bridge circuit by separate connections thereto, and since no common or grounded electrode is used in the passage, the electric field associated with one pair of electrodes is not adversely affected by the proximity of the other pair of electrodes. Nevertheless, the distinct electric fields must be adequately separated so that a fish entering high or low in an orifice would be detected in the field first encountered before it was detected in the second field. In determining a sufficient minimum distance between the downstream and upstream pairs of electrodes consideration is given to the spacing between the electrodes in a pair since if each electrode in a pair is closer to its mate, then the distance between the pairs may be less. Experience has shown that the adjacent edges of two pairs of electrodes can be separated by a distance equal to one-half or more of the distance between the members of a single pair. A lesser separation is possible but greater precision is required in setting the sensitivity of control system 20. A greater separation of the two pairs is permissible provided, that they are close enough so that the particular kind of fish to be counted can at some one instance be in both electric fields. If two pairs of electrodes are a given distance apart, more positive field separation is obtained in the passage using wider electrodes.

The entirely separated electric fields facilitated by the ungrounded electrodes arrangement of the present invention, also makes possible the aquisition of data as to which orifice of the conduit structure the fish initially entered, and thus a determination as to the direction in which the fish are migrating. Because of the shorter length and more concentrated characteristics of the electric fields produced by these electrodes, field leakage outside the electrode area is minimized, and inaccurate counts that may result therefrom are avoided. The shorter conduit structures allowed by such electric fields also permit the objects being counted to be spaced closer together such that large quantities of these objects can be counted per unit of time. Another advantage of the shorter required passage is that the hydraulic design of carefully engineered fish passage structures need not be altered by the presence of the sensing structure. Obviously, other utilizations of the present invention, and other modifications and variations in its details are possible in light of the disclosure herein. It is therefore understood that within the scope of the appended claims the invention may be practiced otherwise than as specially described.

What is claimed is:

1. An apparatus for counting within an electrically conductive fluid medium substances moving therein which have a conductivity different from that of the medium, said apparatus comprising restrictive conduit means having opposing end openings, electrode elements fixed to opposing surfaces contiguous to each end opening of said conduit means and effective in said fluid medium to propagate an electric field across said end opening corresponding thereto, said electrode elements and surfaces defining, in part, passages containing said conductive fluid medium for facilitating transit of said substances into and out of said conduit means, a pair of separate signal producing circuits, first electrical connections between said electrode elements of said openings at one of said opposing ends of said conduit means and one of said pair of signal producing circuits, second electrical connections between said electrode elements of said openings at another of said opposing ends of said conduit means and the other of said pair of signal producing circuits, said first and second electrical connections being electrically isolated from each other, electrically operable logic means having electrical connections to said pair of signal producing circuits and to a pair of count registering means whereby said logic means receives signals produced in accordance with the incidence with which said substances to be counted are present in said passages partially defined by said electrode elements and surfaces, and delivers signals to control the operation of said count registering means.

2. The apparatus of claim 1 wherein each said signal producing circuits comprises a bridge containing in two adjacent arms thereof separate resistance components each of which is defined by a pair of said electrode elements and said conductive fluid medium therebetween in two corresponding end openings of said conduit means.

3. The apparatus of claim 1 wherein each said signal producing circuits comprises a bridge circuit energized by an oscillator inductively coupled therein and having in adjacent arms thereof separately connected resistance components including pairs of said electrode elements and conductive fluid medium therebetween, and said electrical connections of said logic means to each of said signal producing circuits comprises a coupling transformer and a diode, whereby said separate signal producing circuits including their resistance components are effectively electrically isolated from each other.

4. The counting apparatus of claim 1 wherein the distance between said defined passages of individual conduit means determines said control of operation of said count registering means such that only those substances which are of a predetermined size or greater size will be counted.

5. The counting apparatus of claim 1 wherein separate electric fields are present between said electrode elements at each of said defined passages and said control of operation of said count registering means is such that only those substances are counted which enter said separate electric fields and pass completely through said fields so as to leave said conduit means through an opening which is different from that through which they entered.

6. The counting apparatus of claim 5 wherein the distance between said defined passages of individual conduit means further determines said control operation of said count registering means such that only those substances which are of a predetermined size will be counted.

7. The counting apparatus of claim 1, wherein said restrictive conduit means comprises a structure supported on a foundation extending under said conductive fluid medium, wherefore said structure restrains flow of said conductive fluid medium along said foundation, an opening through the structure merging with flared orifices on opposite sides of each of said defined passages and a separate pair of said electrode elements being cooperatively associated with each of said orifices.

8. The counting apparatus of claim 7 wherein an electrode element of a first pair thereof at one of said orifices is fixed to a flaring surface of said orifice opposite to a surface of said foundation, and the other of said electrode elements of said first pair is fixed to said surface of said foundation within said one of said orifices, and an electrode element of a second pair thereof at the other of said orifices is fixed to a surface of said structure closely adjacent to a flaring surface of said other of said orifices, and the other of said electrode elements of said second pair of elements is fixed to said foundation surface.

References Cited

UNITED STATES PATENTS

| | | | |
|---|---|---|---|
| 2,893,633 | 7/1959 | Van Haagen | 235—98 |
| 3,040,980 | 6/1962 | Mann et al. | 235—98 |
| 3,308,660 | 3/1967 | De Ford | 73—194 |

MAYNARD R. WILBUR, Primary Examiner

J. M. THESZ, Jr., Assistant Examiner

U.S. Cl. X.R.

324—71; 235—98